US010836363B2

(12) United States Patent
Bartlett et al.

(10) Patent No.: US 10,836,363 B2
(45) Date of Patent: Nov. 17, 2020

(54) BRAKE PEDAL ASSEMBLY AND INSTALLATION METHOD

(71) Applicant: Honda Motor Co., Ltd., Tokyo (JP)

(72) Inventors: David J. Bartlett, Marysville, OH (US); Evan R. States, Dublin, OH (US); Scott A. Paul, Plain City, OH (US); Akihiko Koike, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 16/050,074

(22) Filed: Jul. 31, 2018

(65) Prior Publication Data

US 2020/0039480 A1 Feb. 6, 2020

(51) Int. Cl.
*B60T 7/06* (2006.01)
*G05G 1/44* (2008.04)
*B62D 65/02* (2006.01)

(52) U.S. Cl.
CPC ............... *B60T 7/06* (2013.01); *B62D 65/02* (2013.01); *G05G 1/44* (2013.01)

(58) Field of Classification Search
CPC .............. B60T 7/06; B62D 65/02; G05G 1/44
See application file for complete search history.

(56) References Cited

U.S. PATENT DOCUMENTS

| | | | |
|---|---|---|---|
| 3,988,945 A | 11/1976 | Fasano | |
| 4,297,550 A | 10/1981 | Leighton | |
| 4,819,500 A | 4/1989 | Musumiya et al. | |
| 5,551,317 A | 9/1996 | Gautier et al. | |
| 5,865,067 A | 2/1999 | Knapp | |
| 6,203,236 B1 * | 3/2001 | Gautier | B60T 11/18 403/322.1 |
| 7,073,408 B2 | 7/2006 | Kim | |
| 7,409,889 B2 * | 8/2008 | Hurwic | B60T 11/18 74/560 |
| 7,748,289 B2 | 7/2010 | Collins | |
| 8,607,660 B2 * | 12/2013 | Khan | B60T 7/06 74/512 |
| 9,506,540 B1 * | 11/2016 | Suzuki | G05G 1/30 |
| 10,703,346 B2 * | 7/2020 | Hwang | G05G 1/327 |

(Continued)

FOREIGN PATENT DOCUMENTS

JP   H04116270 U   * 10/1992

OTHER PUBLICATIONS

EPO Machine Translation of JPH04116270 (U), Oct. 16, 1992. (Year: 1992).*

*Primary Examiner* — Vinh Luong
(74) *Attorney, Agent, or Firm* — Rankin, Hill & Clark LLP (57) ABSTRACT

A brake pedal assembly installation method includes installing a brake operation simulator to a lower part of a dashboard; pivotally mounting a brake pedal arm to a mounting feature associated with brake operation simulator; providing an elastic member with first and second free ends that are normally biased toward one another; securing the first free end of the elastic member to a yoke mounted to an end portion of the push rod; extending the elastic member and securing the second free end of the extended elastic member to the brake pedal arm; aligning an opening on the brake pedal arm with an opening on the yoke; and inserting a lock pin through the openings of the brake pedal arm and the yoke to secure the yoke to the brake pedal arm.

17 Claims, 10 Drawing Sheets

(56) References Cited

U.S. PATENT DOCUMENTS

| | | | | |
|---|---|---|---|---|
| 2005/0104447 A1* | 5/2005 | Okuma | ............... | B60K 23/02 |
| | | | | 303/158 |
| 2007/0193393 A1* | 8/2007 | Collins | ............... | G05G 1/46 |
| | | | | 74/512 |
| 2014/0326102 A1* | 11/2014 | Khan | ............... | G05G 1/44 |
| | | | | 74/512 |
| 2015/0232072 A1* | 8/2015 | Periasamy | ............... | B60T 7/06 |
| | | | | 74/512 |
| 2015/0331442 A1* | 11/2015 | Ganguly | ............... | G05G 1/506 |
| | | | | 74/512 |

* cited by examiner

BRAKE PEDAL ASSEMBLY AND INSTALLATION METHOD

BACKGROUND

Brake pedal assemblies employed in automotive vehicles typically have a pivot location near the top of a brake pedal arm, a brake pedal at the bottom of the arm, and an attachment assembly near the middle of the arm for connecting a push rod (for example, for a brake booster) to the brake pedal arm while allowing some pivoting motion between the two. Such assemblies may include for example, a push rod having an eyelet on one end that is secured around a pin extending from the brake pedal arm, with a cotter pin or other type of retainer clip mounted on the pin to prevent the eyelet from slipping off. In another example, the assembly includes a yoke or clevis having arms that mount on either side of the brake pedal arm, with a pin that is slid through holes in the clevis and arm after the clevis is properly located on the arm. Again, a cotter pin or other type of retainer clip is employed to prevent the pin from sliding back out of the holes. However, if the cotter pin or retainer clip is missing, due to breakage or other means, a potential exists for the connection between the brake pedal arm and push rod to be less than secure. Other attachment methods overcome this concern by, for example, the use of multiple piece push rods, or by employing redundant (secondary) retention means. These methods, however, may be more costly or complicated than it is desirable.

BRIEF DESCRIPTION

According to one aspect, a brake pedal assembly installation method comprises installing a brake operation simulator to a lower part of a dashboard; pivotally mounting a brake pedal arm to a mounting feature associated with brake operation simulator; providing an elastic member with first and second free ends that are normally biased toward one another; securing the first free end of the elastic member to a yoke mounted to an end portion of a brake operation simulator push rod; extending the elastic member and securing the second free end of the extended elastic member to the brake pedal arm; aligning an opening on the brake pedal arm with an opening on the yoke; and inserting a lock pin through the openings of the brake pedal arm and the yoke to secure the yoke to the brake pedal arm.

According to another aspect, a brake pedal assembly installation method comprises installing a brake operation simulator to a lower part of a dashboard; pivotally mounting an upper part of a brake pedal arm to a mounting feature associated with brake operation simulator; providing a spring including a middle part having a substantially U-shape in side view and first and second free ends that are normally biased toward one another; securing the first free end of the spring to a yoke mounted to an end portion of a brake operation simulator push rod; moving the brake pedal arm toward the brake operation simulator; extending the spring and securing the second free end of the extended spring to the brake pedal arm; moving the brake pedal arm away from the brake operation simulator; aligning an opening on the brake pedal arm with an opening on the yoke; and inserting a lock pin through the openings of the brake pedal arm and the yoke to secure the yoke to the brake pedal arm.

According to another aspect, a vehicle brake pedal assembly comprises a brake operation simulator mounted to a lower part of a dashboard and including a push rod extending outwardly therefrom. An end of the push rod has a yoke mounted thereto. The yoke is substantially U-shaped in top view and includes a yoke opening. A brake pedal arm has an upper part pivotally mounted to a mounting feature associated with the brake operation simulator. A portion of a forward wall of the brake pedal arm is received in the yoke and a sidewall of the brake pedal arm includes an opening aligned with the yoke opening. A spring includes a middle part having a substantially U-shape in side view and first and second free ends that are normally biased toward one another. The first free end of the spring is secured in a hole located in the yoke and the second free end of the spring is secured in a hole located in the sidewall of brake pedal arm. A lock pin is secured in the yoke opening and the brake pedal arm opening.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 1:
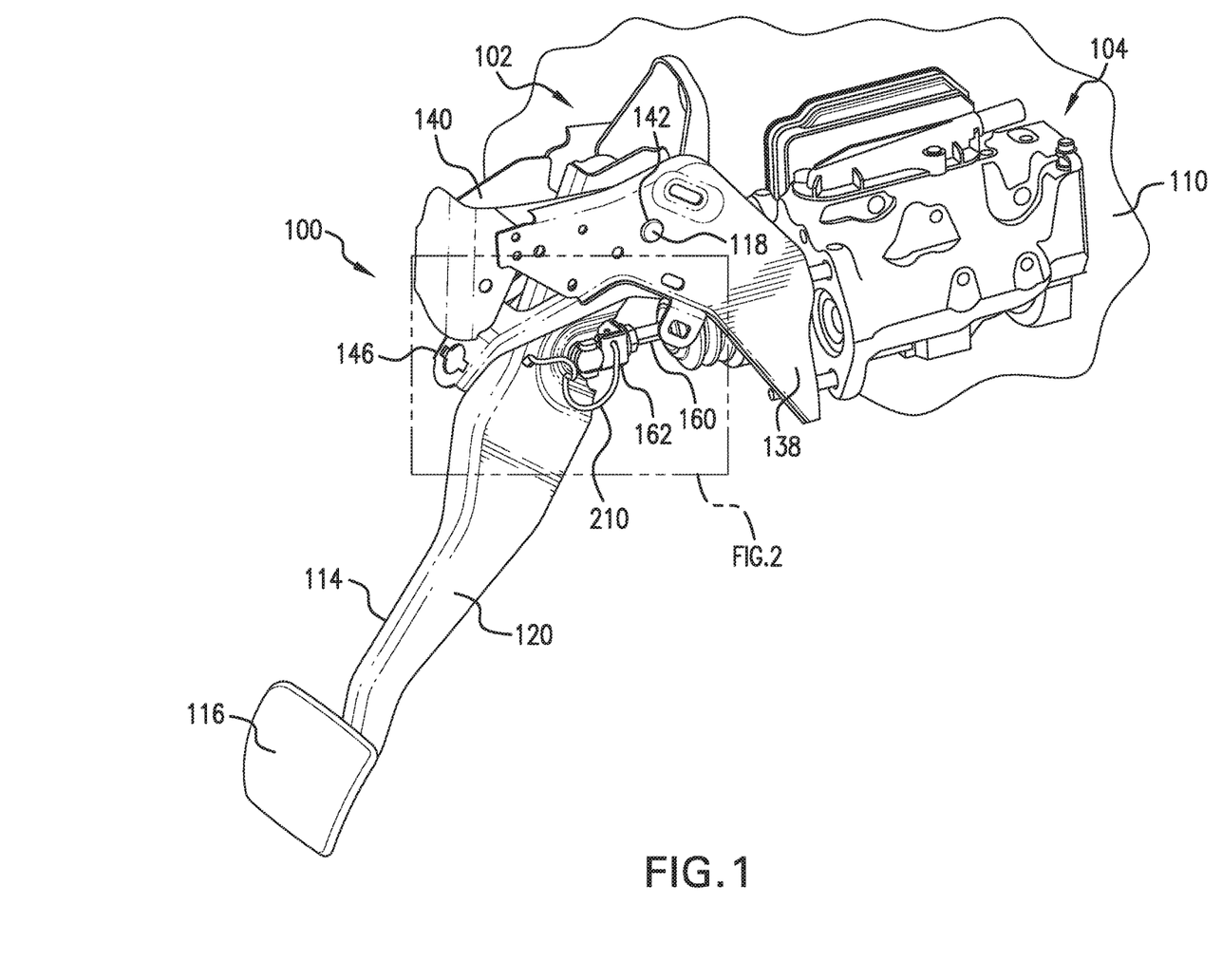
FIG. 1 is a perspective view of an exemplary brake pedal assembly operably connected to a brake operation simulator.
Figure 2:
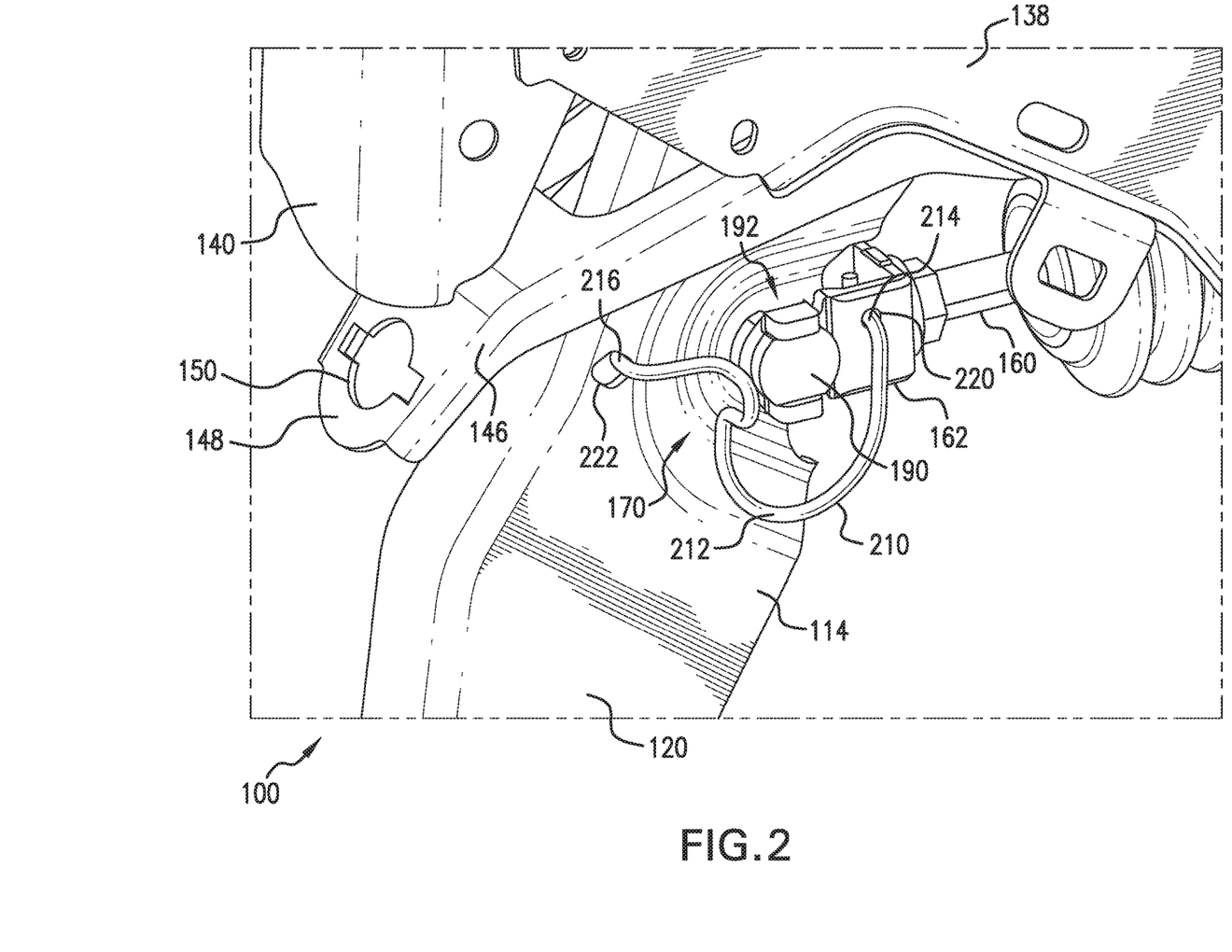
FIG. 2 is an enlarged partial view of FIG. 1.
Figure 3:
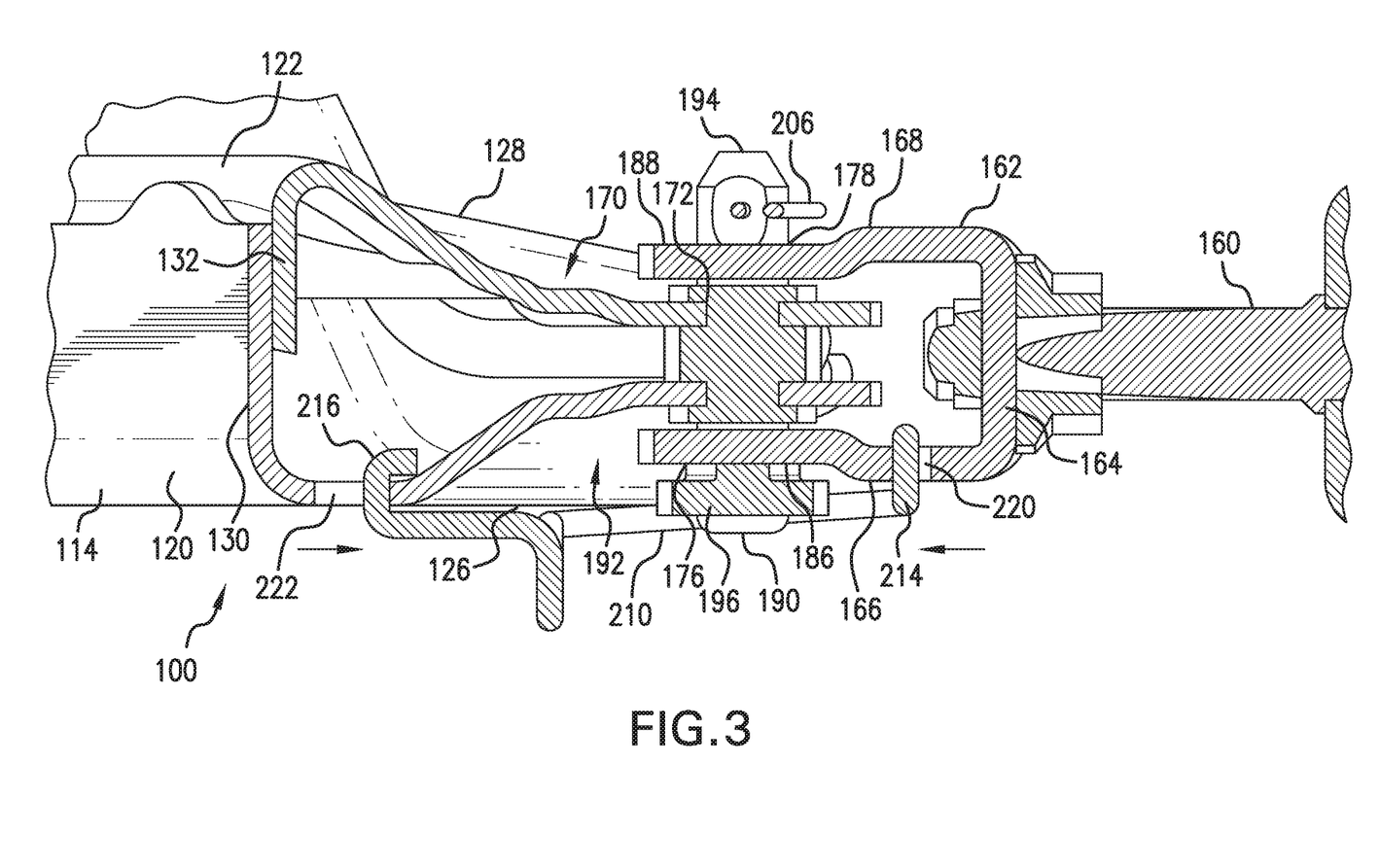
FIG. 3 is a cross-sectional view of the brake pedal assembly.

Referring now to the drawings, wherein like numerals refer to like parts throughout the several views, FIGS. 1-3 illustrate a brake pedal assembly 100 connected to a mounting feature (for example, bracket assembly 102). The bracket assembly 102 is configured to engage a brake operation simulator 104. The brake operation simulator 104 can be installed to a lower part of a dashboard (shown schematically at 110) and enables a brake pedal 116 of the brake pedal assembly 100 to travel a distance corresponding to the operation force applied to the brake pedal. The brake operation simulator 104 is known to those skilled in the art and so will not be discussed or shown in any more detail herein.

The brake pedal assembly 100 includes a brake pedal arm 114, with the brake pedal 116 at a lower end and an upper pivot shaft 118 near an upper end. The brake pedal arm 114 can be a two-piece design including a first arm member 120 secured to a second arm member 122. Each of the first and second arm members 120, 122 can be U-shaped in cross-section including a respective base wall 126, 128 and overlapping flanges (only respective flanges 130, 132 are shown in FIG. 3) extending laterally from the base wall. The upper pivot shaft 108 is secured to the bracket assembly 102. According to one aspect, the bracket assembly 102 can include a first mounting bracket 138 configured for attachment to the brake operation simulator 104 and a second mounting bracket 140 secured to the first mounting bracket 138 and configured to cover the upper end of the brake pedal arm 114. The upper pivot shaft 108 is received in openings 142 in the first mounting bracket 138. A brake pedal arm bracket 146 can be attached to the brake operation simulator 104. The brake pedal arm bracket 146 is U-shaped in top view and is configured to surround the upper end of the brake pedal arm 114. A rearward wall 148 of the brake pedal arm bracket 146 can have a mounting hole 150 for, for example, mounting a brake pedal sensor (not shown).

With continued reference to FIGS. 1-3, a push rod 160 operably associated with and extending from the brake operation simulator 104 is configured for attachment to the brake pedal arm 114. According to one aspect, a clevis or yoke 162 is connected to an end portion of the push rod 160 and is secured to the brake pedal arm 114. The yoke 162 is substantially U-shaped in top view and has a support wall 164 which is fixedly mounted to the push rod 160, and extending away from the support wall 164 are first and second spaced apart sidewalls or legs 166, 168. As illustrated, a portion of a forward wall of the brake pedal arm 114 is received in the yoke 162. Particularly, the brake pedal arm 114 can be provided with a recessed portion 170 (which can be formed on each of the base walls 126, 128 of the respective first and second arm members 120, 122) dimensioned to be received within the yoke 162. The recessed portion 170 includes a laterally extending pin opening 172. The first leg 166 mounts on a first side of the brake pedal arm 114 (i.e., on the base wall 126) and includes a first opening 176 that aligns with the pin opening 172. The second leg 168 mounts on a second side of the brake pedal arm 114 (i.e., on the base wall 128) and includes a second opening 178 that aligns with the pin opening 172. In the depicted aspect, the first leg 166 includes an offset section 186 having the first opening 176, and the second leg 168 includes an offset section 188 having the second opening 178. It should be appreciated that the offset sections 186, 188 allow for a close fit of the yoke 162 on the recessed portion 170 of the brake pedal arm 114.

Figure 10:
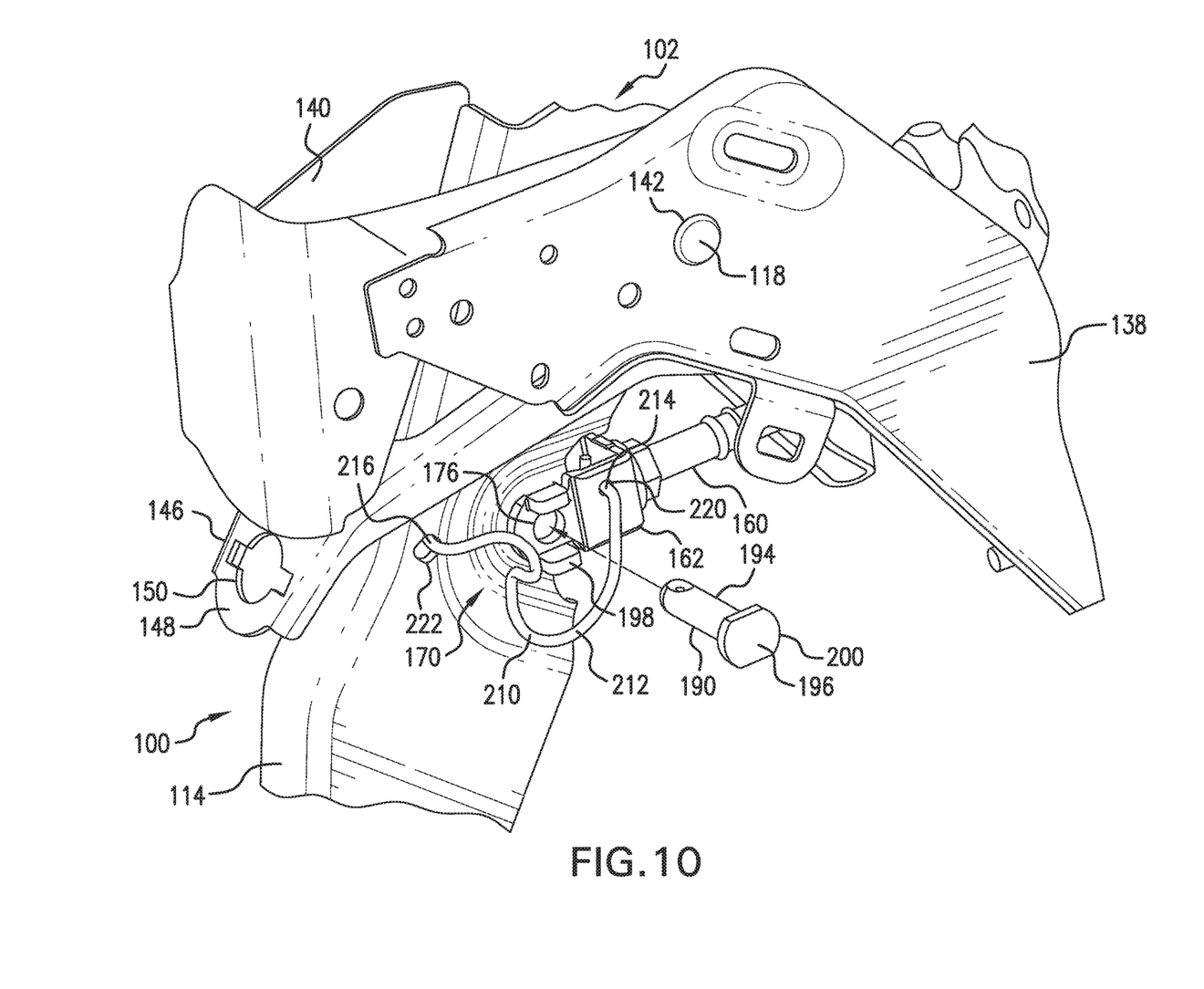
FIG. 10 is a perspective view illustrating another step of the brake pedal assembly installation method.

With reference to FIGS. 2 and 3, a lock pin 190 connects the yoke 162 to the brake pedal arm 114, and when secured, the lock pin 190 defines a joint 192 between the brake pedal arm 114 and yoke 162. The lock pin 190 includes an attachment or shaft portion 194 and a head portion 196. The attachment portion 194 is received through the first and second openings 176, 178 of the yoke 162 and the pin opening 172 in the brake pedal arm 14. The head portion 196 abuts against the first leg 166. In the depicted aspect, the first leg 166 is configured to prevent rotation of the lock pin 190 in the first opening 176 of the yoke 162. As best shown in FIG. 10, at least one tab 198 extends from the first leg 166 and the head portion 196 includes at least one flat section 200 for engagement with the at least one tab 198. With the lock pin 190 in a fixed position, a cotter pin 206 (or other type of retainer clip) is secured to an end of the attachment portion 194 extending from the second leg 168 to prevent the lock pin 190 from sliding back out of the openings 172, 176, 178.

Figure 4:
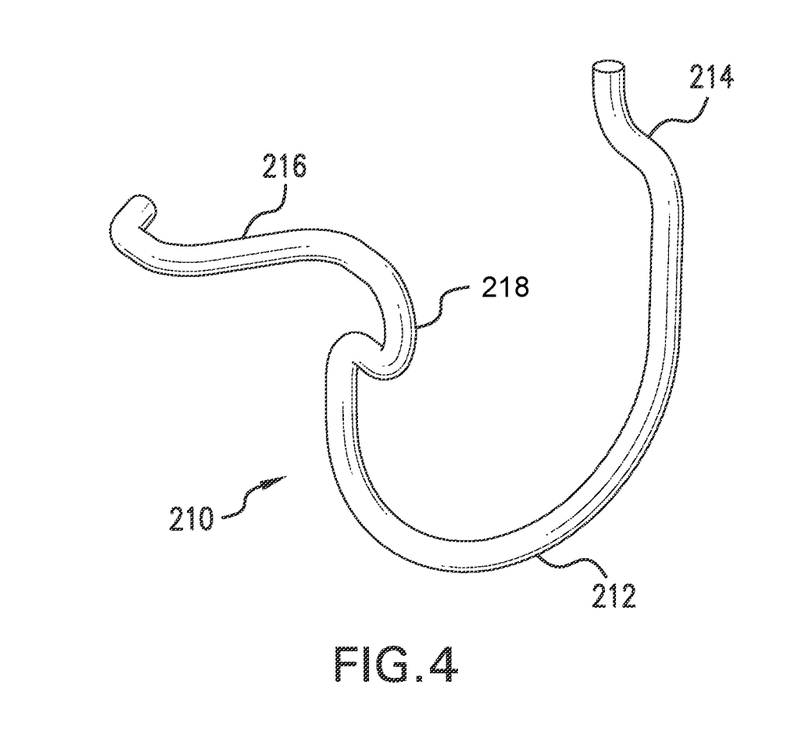
FIG. 4 is a perspective view of an elastic member of the brake pedal assembly.
Figure 8:
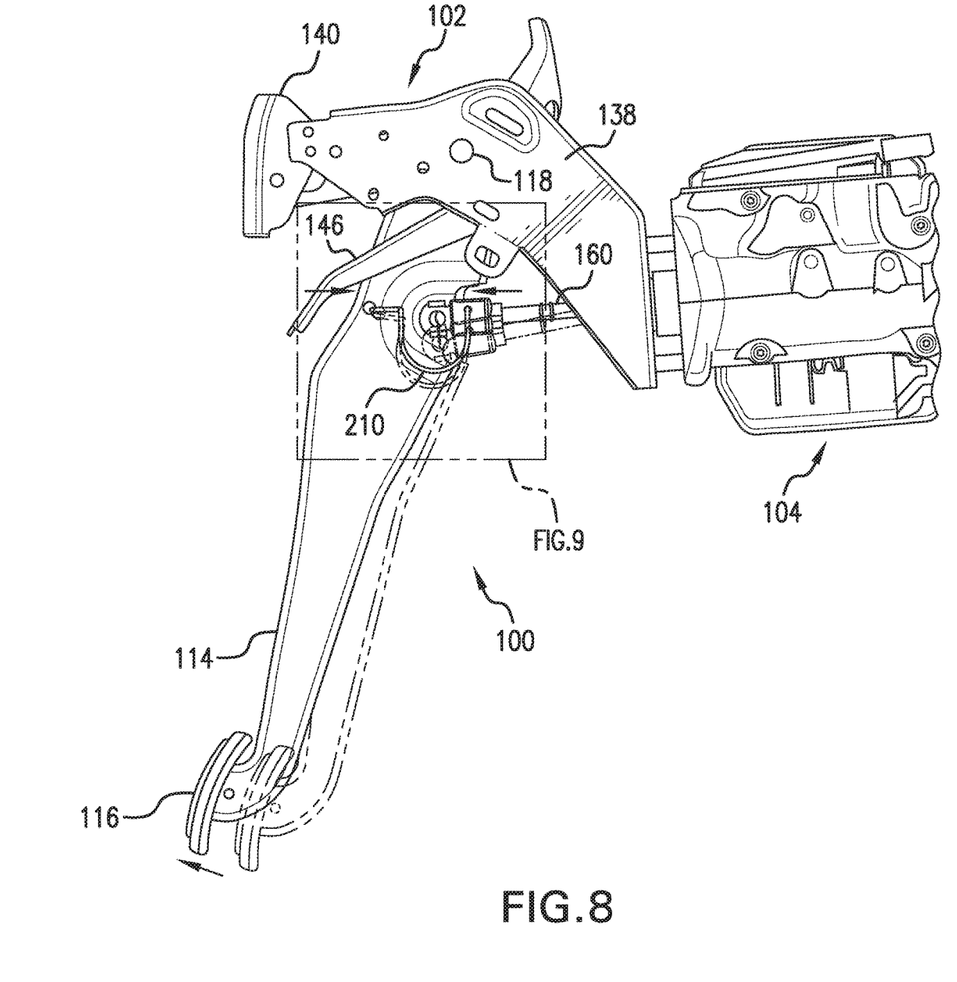
FIG. 8 is a side view illustrating another step of the brake pedal assembly installation method.
Figure 9:
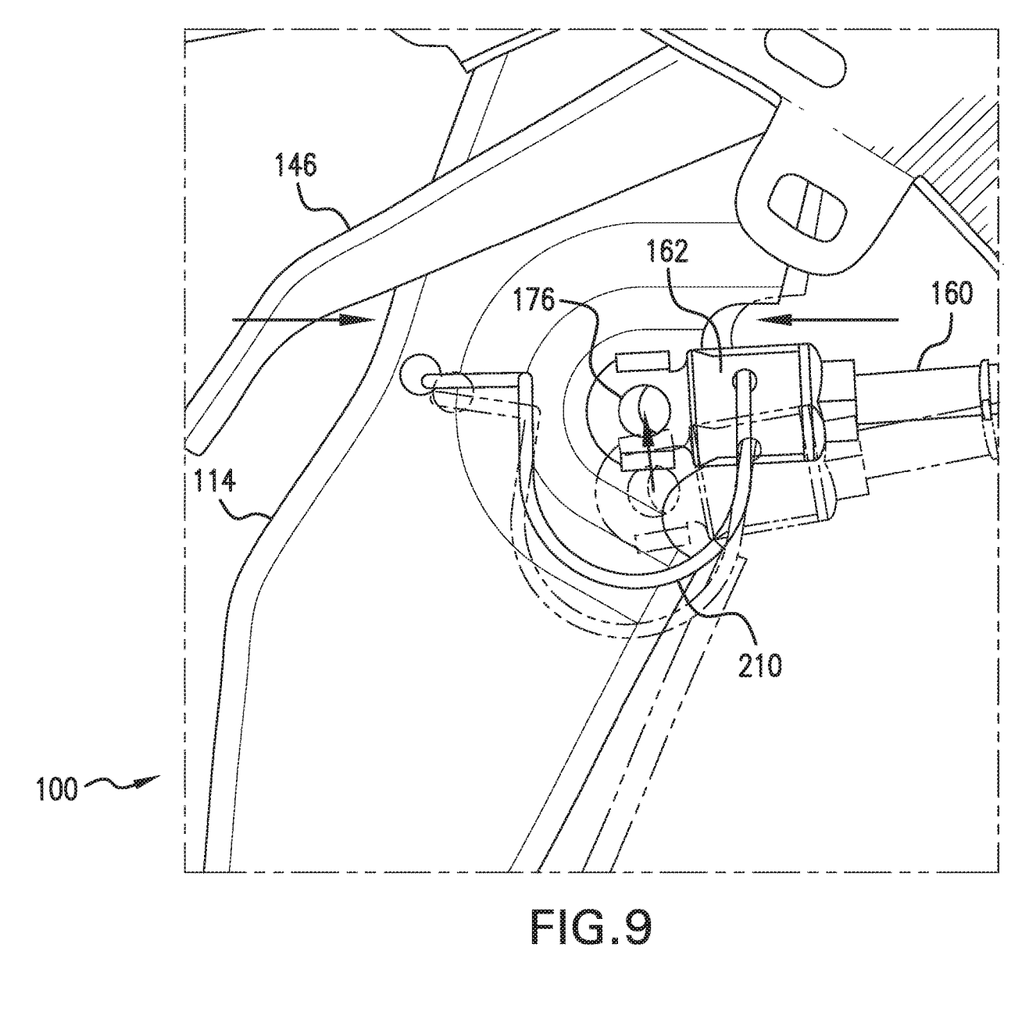
FIG. 9 is an enlarged partial view of FIG. 8.

It should be appreciated that to allow ease of installation of the lock pin 190, tolerances in the joint 192 between the brake pedal arm 114 and yoke 162 are provided. Therefore, to substantially eliminate free-play in the joint 192 an elastic member 210 (for example, a spring) further interconnects the brake pedal arm 114 and yoke 162. In the depicted embodiment of FIG. 4, the exemplary elastic member 210 includes a middle part 212 and first and second free ends 214, 216 that are normally biased toward one another. The middle part 212 is substantially U-shaped in side view and defines a tab 218, which, when the elastic member 210 is secured, extends laterally from the brake pedal arm 114 to define an associated user grip feature (see FIGS. 1 and 2). The first free end 214 is oriented in a first direction relative to the middle part 212, and the second free end 216 is oriented in a second direction relative to the middle part 212 which is toward the first free end 214. More particularly, the first free end 214 is configured to first extend laterally from the middle part 212 in a direction opposite the tab 218, and then extend substantially vertically. The second free end 216 is configured to first extend laterally from the middle part 212 in a direction opposite the tab 218, then extend rearward away from the first free end 214 and then curve back forwardly toward the first free end 214. As shown in FIGS. 2, 3 and 10, the first free end 214 of the elastic member 210 is secured in a hole 220 located in the first leg 166 of the yoke forward of the first opening 178. The second free end 216 of the elastic member 210 is secured in a hole 222 in the pedal brake arm 114 (specifically in the base wall 126 of the first arm member 120) rearward of the pin opening 172. Again, the spring force of the elastic member 210 (depicted by the arrows in FIGS. 3, 8 and 9) substantially eliminates free-play in the joint 192 by moving the brake pedal arm 114 and yoke 162 toward one another, which, in turn, provides for the automatic alignment of the pin opening 172 on the brake pedal arm 114 with the first and second openings 176, 178 on the yoke 162 (see FIGS. 8 and 9). This, in turn, allows for the easy insertion of the lock pin 190. In the secured condition of the elastic member 210, the middle part 212 is looped beneath the inserted lock pin 190, which prevents interference with installation of the lock pin 190 (see FIG. 2).

An installation method for assembling the push rod 160 to the brake pedal assembly 100 will now be described. The exemplary method comprises installing the brake operation simulator 104 to a lower part of the dashboard 110 (see FIG. 1); pivotally mounting the brake pedal arm 114 to the mounting feature 102 associated with brake operation simulator 104 (see FIG. 1); providing the elastic member 210 with the first and second free ends 214, 216 that are normally biased toward one another; securing the first free end 214 of the elastic member 210 to the yoke 162 mounted to an end portion of the push rod 160 (see FIG. 5); extending/stretching the elastic member 210 and securing the second free end 216 of the extended/stretched elastic member to the brake pedal arm 114 (see FIG. 7); aligning the pin opening 172 on the brake pedal arm 114 with the openings 176, 178 on the yoke 162 (see FIGS. 8 and 9); and inserting the lock pin 190 through the openings of the brake pedal arm 114 and the yoke 162 to secure the yoke to the brake pedal arm 114 (see FIG. 10).

Figure 5:
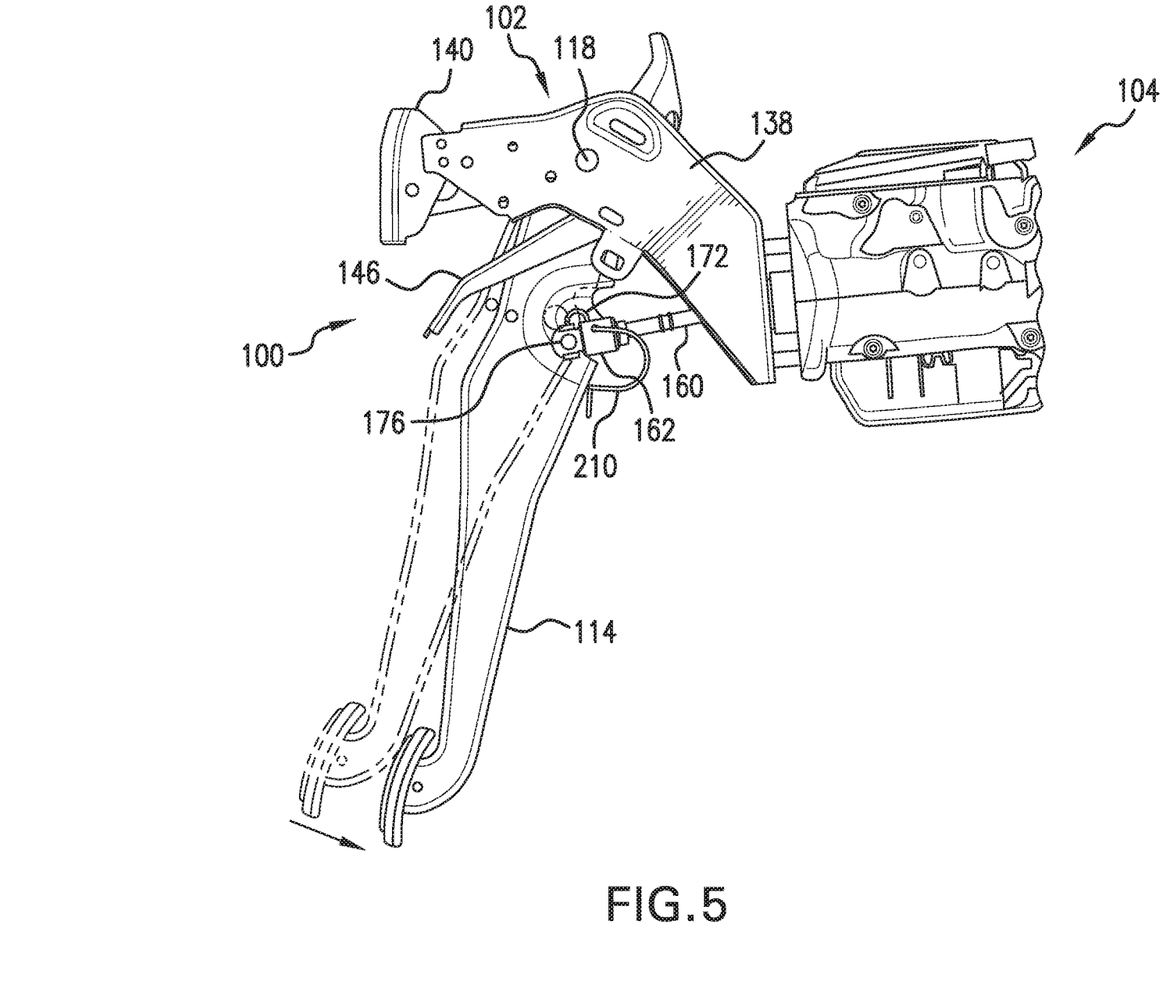
FIG. 5 is a side view illustrating one step of an exemplary brake pedal assembly installation method.
Figure 6:
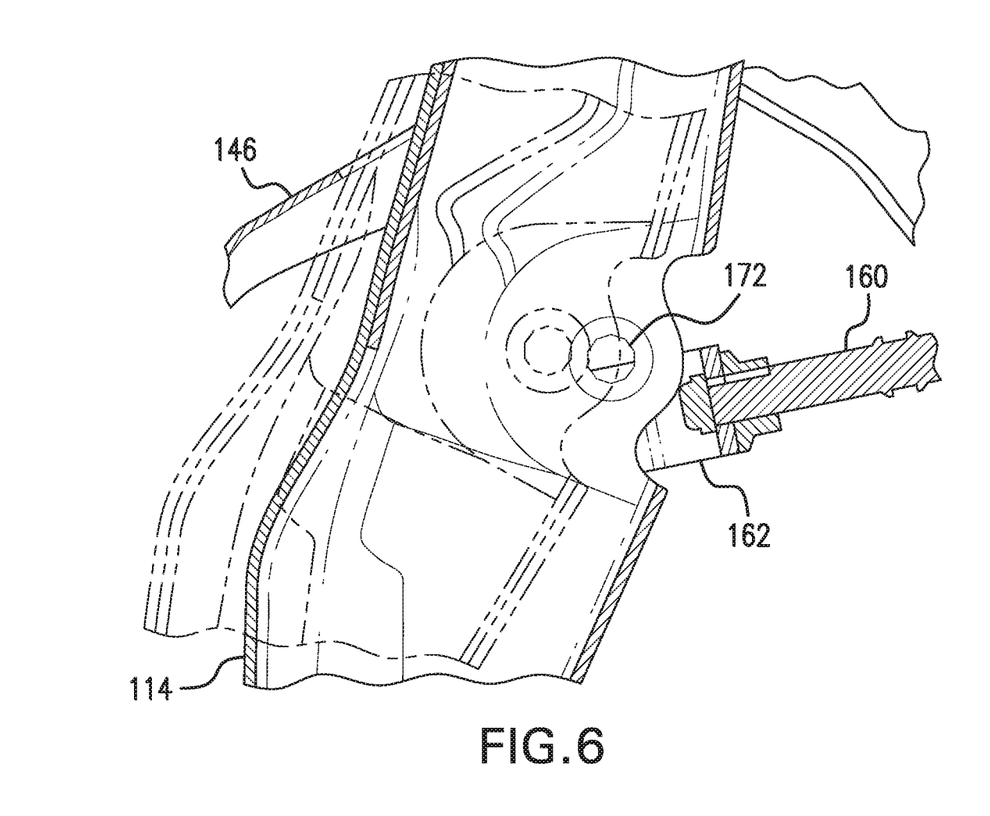
FIG. 6 is a cross-sectional view illustrating another step of the brake pedal assembly installation method.

Prior to extending the elastic member 210 to secure the second free end 216, the exemplary method includes moving the brake pedal arm 114 toward the brake operation simulator 104 into an abutting relationship with the push rod 160 (see FIGS. 5 and 6). This reduces the distance between the hole 222 in the pedal brake arm 114 and the hole 220 located in the first leg 166 of the yoke 162. Further, the above aligning step includes first moving the brake pedal arm 114 away from the brake operation simulator 104 (see FIG. 8), which allows the biasing force of the elastic member 210 to move the openings 176, 178 of the yoke 162 into alignment the pin opening 172 (see FIG. 9). To this end, the method includes configuring the elastic member 210 to move the openings 176, 178 in the yoke 162 into alignment with the opening 172 in the brake pedal arm 114 as the brake pedal arm 114 is moved away from the brake operation simulator 104.

Figure 7:
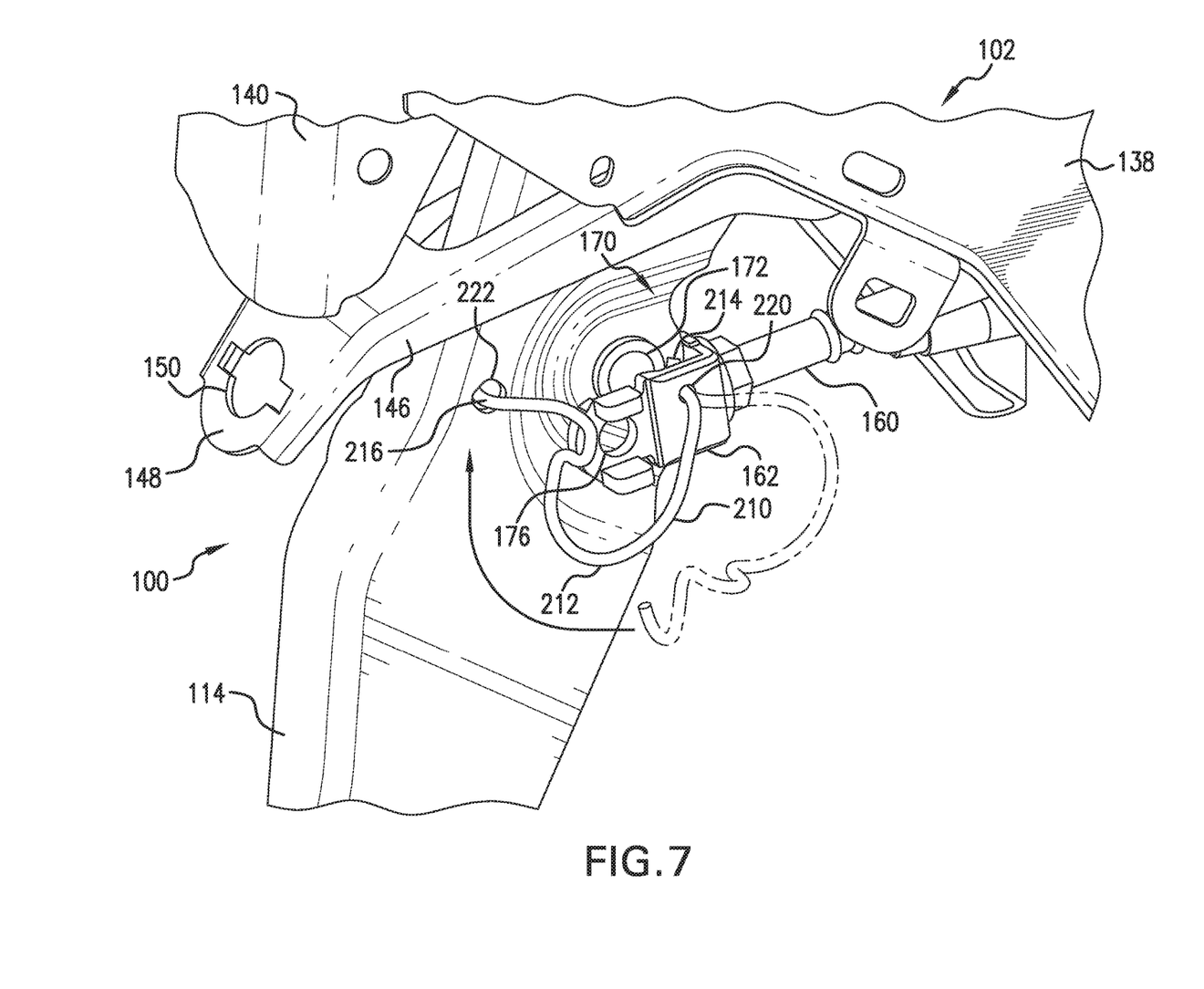
FIG. 7 is a perspective view illustrating another step of the brake pedal assembly installation method.

The exemplary method further includes looping the middle part 212 of the elastic member 210 beneath the inserted lock pin 190, which allows for a compact assembly of the elastic member 210 (see FIG. 7). The exemplary method further includes orienting the first free end 214 of the elastic member 210 in a first direction relative to the middle part 212, and orienting the second free end 216 of the elastic member 210 in a second direction relative to the middle part 212 which is toward the first free end, which allows for ease of connection of the elastic member 210 (see FIG. 4). The exemplary method further includes configuring the elastic member 210 so that the biasing force of the elastic member substantially eliminates free-play in the joint 192 between the brake pedal arm 114 and yoke 162 (see FIG. 3). Further, the exemplary method includes extending the tab 218 of the middle part 212 of the elastic member 210 laterally from the brake pedal arm 114 to define an associated user grip feature (see FIGS. 2 and 4), and locating the elastic member 210 entirely along a single sidewall of the brake pedal arm 114 to allow for insertion of the first and second free ends 214, 216 of the elastic member 210 along the single sidewall of the brake pedal arm 114 (see FIGS. 2 and 7). The exemplary method further includes configuring the sidewall 166 of the yoke 162 to prevent rotation of the lock pin 190 in the yoke opening (see FIG. 10), which allows for ease of insertion of the cotter pin 206. The exemplary method further includes configuring the brake pedal arm 114 with a recessed portion 170 dimensioned to be received within the yoke 162 (see FIG. 3), which provides a reduced connection area between the brake pedal arm 114 and the yoke 162 in the lateral direction.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A brake pedal assembly installation method of a vehicle, the brake pedal assembly including a brake pedal arm and a brake operation simulator with a push rod extending outwardly therefrom, the method comprising:
    installing the brake operation simulator to a lower part of a dashboard;
    pivotally mounting the brake pedal arm to a bracket assembly associated with brake operation simulator;
    providing an elastic member with first and second free ends that are normally biased toward one another;
    securing the first free end of the elastic member to a yoke mounted to an end portion of the push rod;
    extending the elastic member and securing the second free end of the extended elastic member to the brake pedal arm;
    after the elastic member is secured to both the yoke and the brake pedal arm, aligning an opening on the brake pedal arm with an opening on the yoke; and
    inserting a lock pin through the aligned openings of the brake pedal arm and the yoke to secure the yoke to the brake pedal arm.

2. The method of claim 1, wherein the elastic member includes a middle part, and the method includes looping the middle part beneath the inserted lock pin.

3. The method of claim 2, including orienting the first free end of the elastic member in a first direction relative to the middle part, and orienting the second free end of the elastic member in a second direction relative to the middle part which is toward the first free end.

4. The method of claim 2, wherein the middle part of the elastic member defines a tab, and extending the tab laterally from the brake pedal arm to define an associated user grip feature.

5. The method of claim 1, wherein the lock pin secured to the brake pedal arm and the yoke defines a joint between the brake pedal arm and yoke, and including configuring the elastic member so that a biasing force of the elastic member substantially eliminates free-play in the joint.

6. The method of claim 1, wherein prior to extending the elastic member further including moving the brake pedal arm toward the brake operation simulator into an abutting relationship with the push rod.

7. The method of claim 6, including configuring the brake pedal arm with a recessed portion dimensioned to be received within the yoke.

8. The method of claim 1, wherein the aligning step includes first moving the brake pedal arm away from the brake operation simulator.

9. The method of claim 7, including configuring the elastic member to move the opening in the yoke into alignment with the opening in the brake pedal arm as the brake pedal arm is moved away from the brake operation simulator.

10. The method of claim 1, including locating the elastic member entirely along a single sidewall of the brake pedal arm.

11. A brake pedal assembly installation method of a vehicle, the brake pedal assembly including a brake pedal arm and a brake operation simulator with a push rod extending outwardly therefrom, the method comprising:
    installing the brake operation simulator to a lower part of a dashboard;
    pivotally mounting an upper part of the brake pedal arm to a bracket assembly associated with brake operation simulator;
    providing a spring including a middle part having a substantially U-shape in side view and first and second free ends that are normally biased toward one another;
    securing the first free end of the spring to a yoke mounted to an end portion of the push rod;
    moving the brake pedal arm toward the brake operation simulator;
    extending the spring and securing the second free end of the extended spring to the brake pedal arm;
    moving the brake pedal arm away from the brake operation simulator;
    aligning an opening on the brake pedal arm with an opening on the yoke; and
    inserting a lock pin through the openings of the brake pedal arm and the yoke to secure the yoke to the brake pedal arm.

12. The method of claim 11, wherein the brake pedal arm is moved toward the brake operation simulator into engagement with the push rod.

13. The method of claim 11, including configuring the spring to move the opening in the yoke into alignment with the opening in the brake pedal arm as the brake pedal arm is moved away from the brake operation simulator.

14. The method of claim 11, wherein the lock pin secured to the brake pedal arm and the yoke defines a joint between the brake pedal arm and yoke, and including configuring the spring so that a biasing force of the spring substantially eliminates free-play in the joint.

15. The method of claim 11, including locating the middle part beneath the inserted lock pin.

16. The method of claim 11, wherein the first and second free ends of the spring are inserted along a sidewall of the brake pedal arm.

17. The method of claim 11, a configuring a sidewall of the yoke to prevent rotation of the lock pin in the yoke opening.

* * * * *